Patented Jan. 16, 1934

1,943,920

UNITED STATES PATENT OFFICE 1,943,920

PROCESS FOR THE PRODUCTION OF METALLIC MAGNESIUM

Maurice Noel Lacell, Finchley, London, England

No Drawing. Application March 21, 1927, Serial No. 177,225, and in France March 26, 1926. Renewed May 29, 1933

7 Claims. (Cl. 204—19)

This invention relates to a process for the preparation of metallic magnesium.

The known cyclic processes for the preparation of metallic magnesium usually employ the following sequence of operations:

The anhydrous chloride of magnesium is electrolyzed in a molten state and the chlorine coming from the electrolyzing vats is brought into contact with a milk of magnesia, so that the oxide of magnesium is decomposed and that chloride of magnesium and chlorate of magnesium are formed simultaneously.

The chloride of magnesium is then separated from the chlorate by crystallization of the chloride, and the chloride, after dehydration, is electrolyzed in the molten state.

In practice, when it is desired to work with large quantities, the chlorate of magnesium produced represents a great loss of chlorine and magnesia.

Magnesium chloride has also been obtained starting with magnesia by the action of carbon tetrachloride, by liberating carbon oxychloride which likewise reacts upon the magnesia.

The chloride of magnesium obtained in any suitable manner can be dehydrated in the presence of hot nascent hydrochloric acid, for example by burning chlorine and hydrogen at their meeting point in the vessel containing the magnesium chloride to be dehydrated.

The object of the present invention is a new process for the preparation of metallic magnesium which permits all formation of the chlorate to be avoided.

It consists essentially in transforming the chlorine into hydrochloric acid by any suitable method, in then causing the hydrochloric acid formed, to act upon the oxide of magnesium or the carbonate of magnesium so that only the chloride of magnesium is formed to the exclusion of the chlorate.

This fundamental cycle may be completed by the addition of complementary operations. For instance, all or a part of the hydrochloric acid formed may be employed for the preliminary dehydration of the chloride of magnesium treated, the hydrochloric acid recovered at the end of the drying operations being subsequently reintroduced into the cycle.

Preferably the hydrochloric acid will be produced by one of the following methods.

The chlorine, accompanied by a suitable amount of oxygen, will be transformed, by contact with a suitable fuel, into phosgene, $COCl_2$. Upon treatment with water, the phosgene will produce hydrochloric acid and carbonic anhydride, giving the well known reactions.

In the case when free hydrogen is available, the hydrochloric acid may be produced by direct synthesis, by the various known methods, electric or catalytic.

By way of example and in order to make the description more clear, certain special modes of carrying the invention into effect are described hereinafter.

The chlorine, produced by electrolysis, (which is always mixed with more or less air or oxygen, on account of the well known fact that it is very difficult in practice to construct vats which are air tight), is passed over coal or coke brought to a red heat in a suitable container. The mixture of air and chlorine must contain at least one volume of oxygen for two of chlorine and if required a further quantity of fresh air is added to the chlorine from the cells, to give at least this ratio.

Upon contact with the red hot coal phosgene is formed according to the equation:

$$Cl_2 + O + C = COCl_2$$

The phosgene is then brought into contact with water, either in the liquid state, previously heated, or in the state of steam, which water is either pure or mixed with other substances, such for example as hydrochloric acid. The following well known reaction takes place. The term "water" as used in the appended claims is intended to include both water in the liquid state as well as water in the form of steam.

$$COCl_2 + H_2O = 2HCl + CO_2$$

It is to be noted that the above two reactions may be produced either in separate vessels or simultaneously in a single reaction chamber.

In fact, water may be added to the chlorine, either in the liquid state or as steam, with a certain amount of air, before passing the mixture into the vessel containing the red hot coal, or in the vessel itself.

Further, the coal may be replaced by any other substance capable of giving the necessary amount of carbon, for instance a hydrocarbon.

There may possibly remain, in the gases resulting from these various reactions, some undecomposed carbon monoxide. It has no effect upon the subsequent reactions of the cycle.

The hydrochloric acid thus formed is brought into contact with magnesia or with magnesium carbonate to form the magnesium chloride, and the cycle continues.

Instead of proceeding by way of phosgene, it is possible, when pure hydrogen is available, to produce the necessary hydrochloric acid by direct combination, by means of any known process, electric or catalytic, for example. Either the quantity of hydrogen strictly necessary for transforming the chlorine into hydrochloric acid may be used, or the excess amount which is sufficient in order to burn out the oxygen and form water. It is advantageous to burn out the oxygen when it is intended to employ the hydrochloric acid for effecting a preliminary drying of the magnesium chloride for there is a danger of the residual oxygen reacting upon the hydrochloric acid during this drying operation according to the reaction:

$$4HCl + O_2 = 2H_2O + 2Cl_2$$

It is to be noted that the cycle forming the subject of the present invention may be combined to a certain extent with the various cycles employed up to the present, by allowing a certain amount of chlorate, for example, to form and partially by employing the chlorine for transforming it into hydrochloric acid as described above.

Further, the two methods for the production of hydrochloric acid described above may be employed simultaneously in the desired proportions. In this case a part of the chlorine is passed over the red hot coal while the other passes directly into electric or catalytic apparatus in which it has to combine with the hydrogen.

I claim:

1. The cyclic process for the manufacture of magnesium by the electrolysis of fused magnesium chloride, which comprises the steps of bringing the chlorine which is liberated at the anode of the electrolytic vessel with oxygen, into contact with a material containing carbon at a temperature sufficiently elevated to form phosgene, adding water to the phosgene thus obtained to produce hydrochloric acid gas, reacting with the hydrochloric acid gas thus obtained upon an oxygen compound of magnesium to transform it into magnesium chloride.

2. The cyclic process for the manufacture of magnesium which comprises the sequence of steps, viz:—the electrolysis of fused magnesium chloride, then reacting with the chlorine which is liberated at the anode of the electrolysis of the magnesium chloride and with oxygen upon a material containing carbon at a temperature adapted to form phosgene, adding water to the phosgene thus obtained in such proportions as to form hydrochloric acid gas, dehydrating magnesium chloride by the hydrochloric acid gas thus obtained, and acting with the hydrochloric acid gas thus charged with water upon an oxygen compound of magnesium to transform it into magnesium chloride, which is afterwards dehydrated as explained above by the hydrochloric acid gas, and is thereafter used in the electrolytic step first mentioned.

3. A process of producing magnesium by a process which includes a double counter progression of materials, as follows: ($a1$) introducing magnesia into contact with hydrochloric acid and water to form magnesium chloride in a wet condition, ($a2$) drying the magnesium chloride by heat in contact with a current of hot, substantially dry hydrochloric acid gas, then ($a3$) subjecting the dried magnesium chloride to electrolysis to produce magnesium and chlorine, ($b1$) converting the chlorine from step ($a3$) into hydrochloric acid gas, ($b2$) passing such hydrochloric acid gas into the step ($a2$) to dry the magnesium chloride and to moisten the hydrochloric acid gas, ($b3$) passing such moistened hydrochloric acid into step ($a1$) to produce wet magnesium chloride, said step of converting the chlorine into hydrochloric acid being performed by passing the chlorine, together with oxygen in amount equal to at least one-half the absolute volume of chlorine, through a heated space in contact with hot carbonaceous fuel, to form phosgene, and treating the phosgene with water not in substantial excess.

4. The cyclic process for the manufacture of magnesium by the electrolysis of fused magnesium chloride, which comprises the steps of bringing the chlorine which is liberated at the anode of the electrolytic vessel, with oxygen into contact with a material containing carbon at an elevated temperature, adding water only in such an amount to obtain hydrochloric acid gas in a substantially dry state, heating wet magnesium chloride in such substantially dry hydrochloric acid gas, and reacting with the hydrochloric acid upon an oxygen compound of magnesium to transform it into magnesium chloride.

5. The cyclic process for the manufacture of magnesium, which comprises electrolysis of fused magnesium chloride, bringing the chlorine which is liberated at the anode of the electrolytic vessel, with oxygen, into contact with a material containing carbon at an elevated temperature, adding a mixture of liquid water and steam to obtain hydrochloric acid gas while controlling the proportions of water and steam so as to maintain the temperature of reaction below that at which the slag from the carbonaceous material would fuse, and controlling the total amount of water and steam to such proportions as will give substantially dry HCl gas, heating magnesium chloride containing water, in an atmosphere of said substantially dry HCl gas, sufficiently to dehydrate the $MgCl_2$, whereby wet hydrochloric acid is produced, and reacting with the wet hydrochloric acid thus obtained upon an oxygen compound of magnesium to transform it into magnesium chloride.

6. The cyclic process for the manufacture of magnesium by the following steps:—electrolysis of fused magnesium chloride, sending the chlorine which is liberated at the anode of the electrolytic vessel with oxygen into contact with a material containing carbon at an elevated temperature, adding water to obtain hydrochloric acid gas, utilizing the hydrochloric acid gas so formed for the dehydration of partially hydrated magnesium chloride and reacting with the hydrochloric acid remaining after said dehydration step upon an oxygen compound of magnesium to transform it into magnesium chloride.

7. The cyclic process for the manufacture of magnesium by the following steps:—electrolysis of fused magnesium chloride, sending the chlorine which is liberated at the anode of the electrolytic vessel with oxygen into contact with a hot carbonaceous material, adding a mixture of liquid water and steam to obtain hydrochloric acid gas, controlling the proportions of water and steam so as to maintain the temperature of reaction below that at which the slag from the carbonaceous material would fuse, utilizing the hydrochloric acid gas so formed for the dehydration of partially hydrated magnesium chloride and reacting with the hydrochloric acid after the said dehydration step upon an oxygen compound of magnesium to transform it into magnesium chloride.

MAURICE NOEL LACELL.